UNITED STATES PATENT OFFICE 2,087,133

DYESTUFFS OF THE NAPHTHALENE-1.4.5.8-TETRACARBOXYLIC ACID DIIMIDE SERIES

Heinrich Vollmann, Frankfort-on-the-Main-Unterliederbach, Germany, assignor to General Aniline Works, Inc., New York, N. Y., a corporation of Delaware No Drawing. Application March 18, 1936, Serial No. 69,583. In Germany April 15, 1933

8 Claims. (Cl. 260—124)

This invention relates to dyestuffs of the naphthalene-1,4,5,8-tetracarboxylic acid diimide series.

I have found that new deeply colored derivatives of naphthalene-1,4,5,8-tetracarboxylic acid are obtainable by causing a naphthalene-1,4,5,8-tetracarboxylic acid which is halogenated in the nucleus or the anhydride or imide thereof to react with ammonia or an amine, for instance, an aliphatic or aromatic amine, and simultaneously or separately exchanging the halogen for an amine radical.

By causing, for instance, 2,6-dichlornaphthalene-1,4,5,8-tetracarboxylic acid to react with aniline under mild conditions, there is first obtained the practically colorless 2,6-dichlornaphthalene-1,4,5,8-tetracarboxylic acid diphenylimide of Formula I. By further reaction with aniline, for instance, by a short boiling with an excess of aniline, there is obtained the 2-anilino-derivative of the Formula II which has a violet-red color. Finally, there is obtained by boiling for a prolonged time in aniline the deep-blue 2,6-dianilinonaphthalene-1,4,5,8-tetracarboxylic acid diphenylimide which crystallizes in the form of long needles having a metallic luster and corresponds to the Formula III.

contain substituents, for instance, alkyl, hydroxyl, carboxyl or the like. Amino-salicyclic acids may, for instance, be used in the present process.

Some of the products may be used directly as dyestuffs, for instance, for dyeing the vegetable fiber from the vat or, in case they contain the salicyclic acid radical, as dyestuffs capable of being chromed. Others may be transformed by sulfonation into acid dyestuffs. The sulfo group may be introduced at any stage of the process, for instance, into the parent material or into an intermediate product.

The products are new. There are obtained, for instance, those of the general formula:

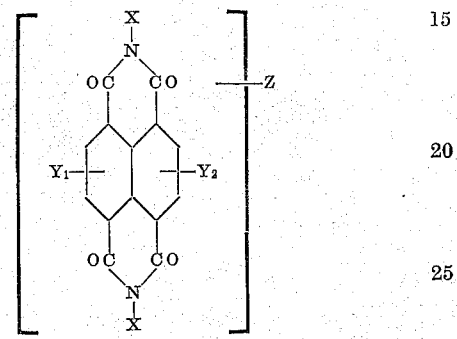

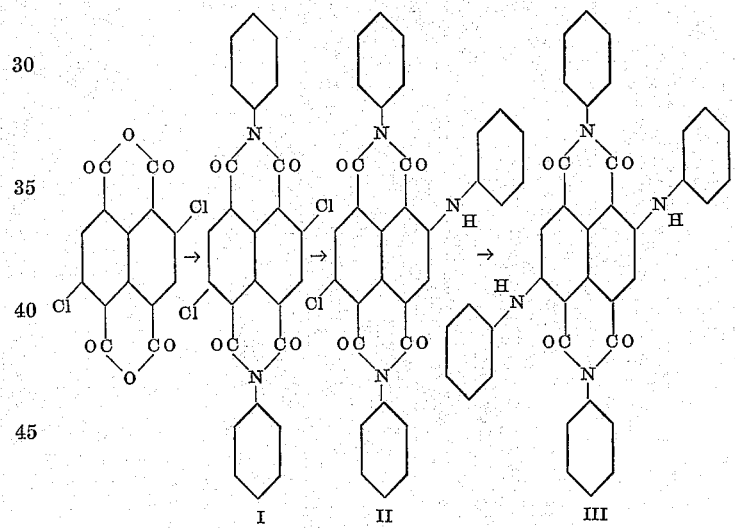

I II III

Analogously there may be caused to react with ammonia or an amine other imides, for instance, unsubstituted diimides or dialkylimides of naphthalene-1,4,5,8-tetracarboxylic acids halogenated in the nucleus, as indicated more fully in the examples. The aryl nuclei of the amines may wherein X represents hydrogen, alkyl, cycloalkyl or aryl, $Y_1$ represents —NH—aryl, —NH—alkyl or —NH—cycloalkyl, $Y_2$ means that a further substituent of the value $Y_1$ or chlorine may be present and Z means that the compounds may contain sulfo groups.

Naphthalene-1,4,5,8-tetra-carboxylic acids halogenated in the nucleus which are used as parent materials in the present process may be obtained either by direct halogenation of naphthalene-1,4,5,8-tetra-carboxylic acid anhydride under strong conditions or according to the process of U. S. A. patent application Serial No. 659,238 filed on March 1, 1933, in the name of Wilhelm Eckert and Ernst Fischer for a Nuclear substituted acenaphthalic acids and 1,4,5,8-naphthalene-tetra-carboxylic acids and a process of preparing them by oxidation of halogenated acenaphthalic acids or by oxidizing decomposition of polyhalogen-pyrenes (obtainable according to the process of U. S. A. Patent No. 2,018,935).

The reaction is effected by heating the components in the presence or absence of an indifferent solvent, an acid binding agent or an agent catalytically activating the exchange of halogen, if desired, with application of pressure.

The following examples serve to illustrate the invention but they are not intended to limit it thereto, the parts being by weight:

(1) 6 parts of 2-chloronaphthalene-1,4,5,8-tetracarboxylic acid anhydride (crystallizing from nitrobenzene in the form of colorless brilliant leaflets, melting at 334° C.) are heated with 100 parts of para-toluidine to gently boiling for 1 hour. The deep carmine-red solution is diluted, after cooling to about 80° C., with alcohol and the crystalline red precipitate is filtered with suction. After extracting by boiling with water and drying there are obtained 9.4 parts of 2-(para-toluidino)-naphthalene-1,4,5,8-tetracarboxylic acid-di-para-tolylimide. It crystallizes from xylene in the form of violet-red needles melting at 355° C. It dissolves in concentrated sulfuric acid to a greenish-blue solution.

(2) (a) 6 parts of 2-chloronaphthalene-tetracarboxylic acid anhydride are heated to boiling, while stirring, in 100 parts of glacial acetic acid. On addition of 4 parts of para-toluidine a temporary solution is formed, from which the di-para-tolylimide of 2-chloronaphthalene-tetracarboxylic acid separates in the form of a thick magma of faintly yellowish needles. The whole is filtered with suction, the solid matter is washed with alcohol and dried. It melts at about 415° C.

(b) 2 parts of the 2-chloronaphthalene-tetracarboxylic acid ditolylimide thus obtained are heated to boiling with 10 parts of cyclohexylamine in a reflux apparatus. The parent material gradually dissolves. The eosine-red solution is further heated for about a quarter of an hour, diluted with alcohol and allowed to cool whereby the 2-cyclohexylamino-naphthalene-1,4,5,8-tetracarboxylic acid ditolylimide crystallizes in the form of orange-red needles having a metallic luster and melting at 220° C. The product dissolves in xylene to an eosine-red solution and, when diluted, shows an intense green-yellow fluorescence. By sulfonation a sulfonic acid is obtained which dissolves in water to a red solution; and dyes wool clear bluish red shades.

(3) 2.4 parts of the chloronaphthalene-tetracarboxylic acid-ditolylimide obtainable according to Example 2a are heated to boiling for one hour under reflux with 2 parts of alpha-aminoanthraquinone, 2 parts of sodium acetate and 0.1 part of copper acetate in 50 parts of nitrobenzene. After cooling to 50° C.–70° C., the whole is filtered with suction, the solid matter is washed with hot alcohol and the residue is extracted by boiling with water and dried. The 2-(alpha-anthraquinonyl)-aminonaphthalene-1,4,5,8-tetracarboxylic acid ditolylimide crystallizes in the form of orange-red needles and dissolves in concentrated sulfuric acid to a blue solution. It yields a green vat with a red scum (vat bloom) dyeing cotton pink tints.

By using in the above-described mixture instead of alpha-aminoanthraquinone the 1-amino-5-benzoylaminoanthraquinone there is obtained an analogously constituted reaction product which dissolves in concentrated sulfuric acid to a turbid red-violet solution which, on addition of a small quantity of water, turns a pure reddish-blue. This product dyes cotton from a green vat intense yellowish-red tints.

(4) 3 parts of 2-chloronaphthalene-tetracarboxylic acid anhydride are heated to boiling for a short time in a reflux apparatus with 40 parts of hydroxethylamine (ethanolamine) and the solution is diluted with water. The brown-red crystalline precipitate is filtered with suction and recrystallized from 100 parts of feebly acidified water. Thus, there are obtained 3.5 parts of a product which crystallizes in the form of brown-red needles having a metallic luster, does not contain chlorine and whose content of nitrogen indicates that the product is 2-hydroxethyl-aminonaphthalene-1,4,5,8-tetracarboxylic acid-dihydroxethylimide. The product without being sulfonated is already soluble in hot water and dyes wool red tints.

(5) 8.5 parts of 2,6-dichloronaphthalene-1,4,5,8-tetracarboxylic acid anhydride (crystallizing from nitrobenzene in the form of colorless brilliant leaflets, and made, for instance, by oxidizing decomposition of 2,5,7,10-tetrachloropyrene-3,8-quinone described in Example 7 of U. S. Patent No. 2,018,935) are heated to gently boiling in 100 parts of para-toluidine, while stirring. The solution becomes temporarily carmine red and assumes finally a pure greenish-blue color. From the hot solution part of the reaction product separates in the form of dark needles having a metallic luster. The whole is diluted with 100 parts of alcohol, filtered with suction while hot, washed with alcohol and the residue is boiled with acidified water and dried. The yield amounts to 15 parts of 2,6-ditoluidonaphthalene-1,4,5,8-tetracarboxylic acid-di-para-tolylimide (more than 90% of the theoretical). The product crystallizes from nitrobenzene in the form of dark blue reddish needles having a metallic surface luster and melting at about 400° C. It dissolves in concentrated sulfuric acid to a blue solution which turns gradually violet on standing. By sulfonation under mild conditions, for instance, by stirring it at room temperature with 15 times its weight of sulfuric acid monohydrate, there is obtained a wool dyestuff which yields clear greenish-blue tints of very good fastness properties.

(6) 8.5 parts of 2,6-dichloronaphthalene-tetracarboxylic acid anhydride yield on reaction with aniline (carried out in a manner analogous to that described in Example 5), 13.5 parts of 2,6-dianilinonaphthalene-1,4,5,8-tetracarboxylic acid-diphenylimide which crystallizes in the form of long dark blue needles having a metallic luster and melting above 400° C. By sulfonation there are obtained wool dyestuffs which yield blue tints of a more reddish hue than the analogously constituted toluidine derivative described in the preceding example.

The products described in Examples 5 and 6 may be obtained with the same purity but with a correspondingly smaller yield by starting instead of from pure 2,6-dichloronaphthalene-tetracarboxylic acid anhydride, from the mixture probably of 2,6- and 2,7-dichloronaphthalene-1,4,5,8-tetracarboxylic acid obtainable according to the process of U. S. Patent No. 2,009,596 by oxidizing decomposition of hexachlorpyrene described in U. S. Patent No. 2,018,935.

(7) (a) 8.5 parts of 2,6-dichloronaphthalene-tetracarboxylic acid are heated to boiling, while stirring, in 100 parts of glacial acetic acid with 4.6 parts of aniline. At first partial dissolution takes place; thereupon the 2,6-dichloronaphthalene-1,4,5,8-tetracarboxylic acid-di-phenylimide precipitates in the form of yellowish to reddish-grey crystals. It crystallizes from nitrobenzene in the form of brilliant needles which melt above 400° C. and have generally a faintly grey-violet color on account of traces of the 2-anilino-derivative already formed. The product dissolves in concentrated sulfuric acid to a faintly yellow solution and forms a blue-green vat with an intense red fluorescence.

(b) 4.8 parts of the 2,6-dichloronaphthalene-tetracarboxylic acid-diphenylimide are heated to boiling, while stirring, for one hour with 5 parts of 1-aminoanthraquinone, 5 parts of anhydrous sodium acetate and 0.5 part of copper acetate in 100 parts of nitrobenzene. The reaction product crystallizes for the greater part already during the boiling. It is filtered with suction, washed first with hot xylene, then with alcohol and the residue is boiled with acidified water. The product crystallizing in the form of blue-violet small needles is difficultly soluble in boiling nitrobenzene; it is free from halogen and according to the analysis and its preparation it is apparently the 2,6-di-(alpha-anthraquinonyl)-aminonaphthalene-1,4,5,8-tetracarboxylic acid-diphenylimide. It dissolves in concentrated sulfuric acid to a greenish-blue solution and dyes cotton from a green vat grey-blue tints of good fastness to washing and to chlorine.

(8) 33 parts of 2,6-dichloronaphthalene-1,4,5,8-tetracarboxylic acid anhydride are stirred at water bath temperature with 300 parts of a concentrated aqueous ammonia solution. In the course of about one hour the reaction with formation of the diimide is terminated. The mixture is filtered with suction, the solid matter is extracted with boiling dilute caustic soda solution whereby the sodium salt of the diimide crystallizes in the form of faintly brownish-yellow needles, and filtered. The filtrate may contain unchanged naphthalene-tetracarboxylic acid, whereas on acidification of the residue the pure diimide of 2,6-dichloronaphthalene-1,4,5,8-tetracarboxylic acid is obtained. It yields with alkaline hydrosulfite solution a deep carmine red vat having a brown-red fluorescence.

10 parts of the diimide thus prepared are stirred with 100 parts of alpha-naphthylamine at 180-250° C.; at first there is obtained a red-violet solution (mononaphthylamino-monochloro-derivative) which then turns blue; the 2,6-di-(alpha-naphthylamino)naphthalenetetracarboxylic acid-diimide precipitates even from the hot solution in the form of dark blue needles having a metallic luster. The mass is diluted, while hot with pyridine, filtered with suction and washed with hot alcohol. The product dissolves in concentrated sulfuric acid gradually to a reddish-blue solution whereby sulfonation takes place. The sulfonic acid dyes wool blue tints.

(9) 17 parts of 2,6-dichloronaphthalene-1,4,5,8-tetracarboxylic acid anhydride are heated to boiling, while stirring, in 200 parts of glacial acetic acid and a solution of 8 parts of methylamine solution of 40% in 100 parts of glacial acetic acid is run in. Hereby dissolution occurs in part; thereupon the dimethylimide of 2,6-dichloronaphthalenetetracarboxylic acid formed separates in the form of a thick magma of yellowish-grey needles. By recrystallization from trichlorobenzene the product is obtained in the form of nearly colorless (feebly reddish) brilliant needles melting at 360° C.

17 parts of the dimethylimide thus prepared are stirred on the steam bath for ½ hour with 125 parts of para-toluidine and the solution which has become deep carmine-red is diluted with alcohol. The reaction product, isolated by filtering with suction, crystallizes from chlorobenzene in the form of flat violet-red needles having a brownish metallic luster and melting at 287° C. Probably it is the 2-(para-toluidino)-6-chloronaphthalenetetracarboxylic acid-dimethylimide. By sulfonation there is obtained a sulfonic acid which dyes wool Bordeaux-red tints.

By heating the mixture described in the preceding paragraph at a higher temperature (about 1 hour at 160° C.) the second chlorine atom is exchanged for the toluidine radical and the 2,6-di-(para-toluidino)-naphthalene-tetracarboxylic acid-dimethylimide is obtained crystallizing in the form of blue needles. By sulfonation there is obtained a dyestuff which dyes wool clear blue tints.

(10) 10 parts of 2,7-dichloronaphthalene-1,4,5,8-tetracarboxylic acid anhydride (prepared, for instance, according to U. S. patent application Serial No. 659,238 filed on March 1, 1933, in the name of Wilhelm Eckert and Ernst Fischer for Nuclear substituted acenaphthalic acids and 1,4,5,8-naphthalene-tetracarboxylic acids and a process of preparing them by dichlorination of acenaphthalic acid anhydride, melting at 289° C. and oxidation of the dichloracenaphthalic acid anhydride thus obtained, melting at 272° C. to the dichloronapthalene-tetracarboxylic acid, the anhydride of which crystallizes from chlorobenzene with addition of glacial acetic acid anhydride in the form of brilliant leaflets, melting at 298° C.) are heated to gently boiling with 70 parts of para-toluidine. Already after a few minutes the solution assumes a deep bluish-red color which, on further heating, does not change, contrary to the 2,6-dichloronaphthalenetetracarboxylic acid. The solution is diluted with alcohol and the chlorine-free reaction product which has separated is filtered with suction; the yield amounts to 19 parts. It crystallizes from xylene in the form of red-violet needles having a metallic luster and melting at 330° C. It dissolves in concentrated sulfuric acid to a blue-violet solution.

I claim:
1. The members of the group consisting of compounds of the general formulae:

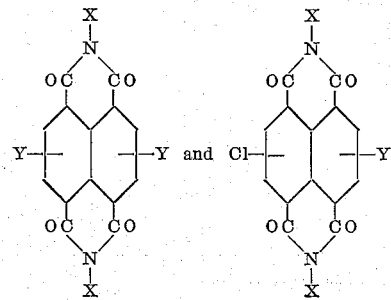

wherein X represents a member of the group consisting of hydrogen, alkyl, cycloalkyl and aryl, Y represents a member of the group consisting of —NH—aryl, —NH—alkyl, and —NH—cycloalkyl, and the sulfonic acids of these compounds.

2. The members of the group consisting of compounds of the following general formulae:

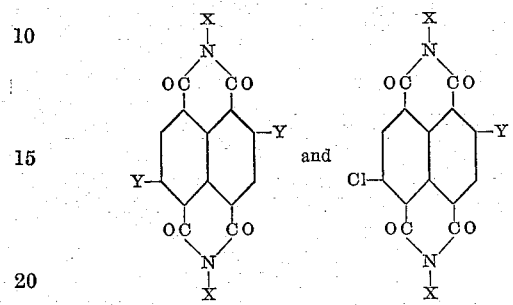

wherein X represents a member of the group consisting of hydrogen, alkyl, cycloalkyl and aryl, Y represents a member of the group consisting of —NH—aryl, —NH—alkyl and —NH—cycloalkyl, and the sulfonic acids of these compounds.

3. The members of the group consisting of compounds of the general formula:

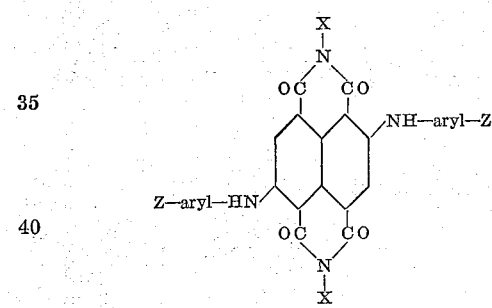

wherein X represents aryl and Z means a member of the group consisting of hydrogen and sulfo group.

4. The compound of the formula:

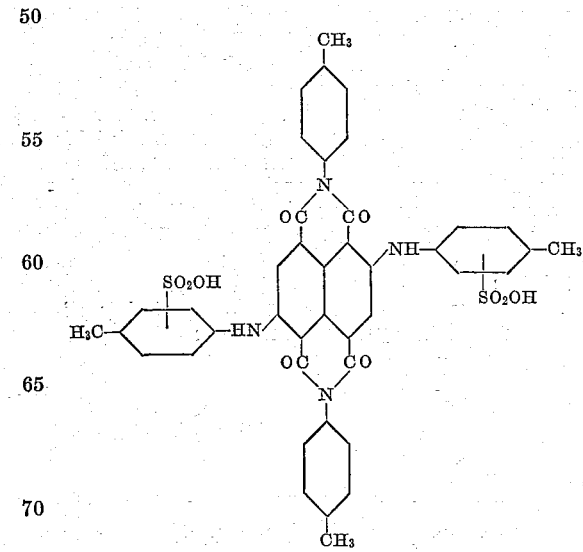

dyeing wool clear greenish-blue tints of very good fastness properties.

5. The compound of the formula:

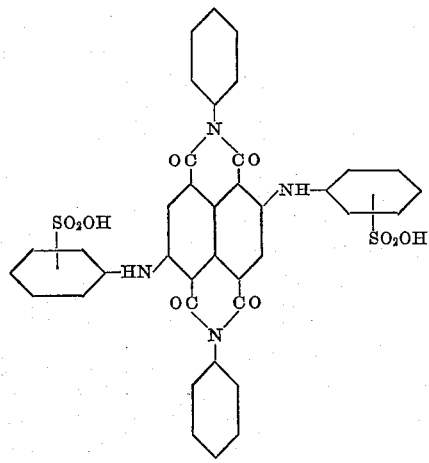

dyeing wool blue tints of very good fastness properties.

6. The compound of the formula:

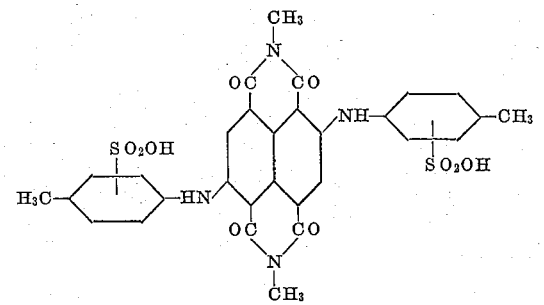

dyeing wool clear blue tints.

7. The compounds of the formula

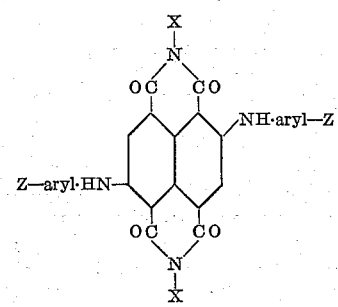

wherein X represents a member of the group consisting of hydrogen, alkyl, cycloalkyl and aryl, and Z means a member of the group consisting of hydrogen and sulfo group.

8. The compounds of the formula

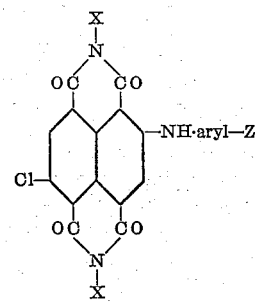

wherein X represents a member of the group consisting of hydrogen, alkyl, cycloalkyl and aryl, and Z means a member of the group consisting of hydrogen and sulfo group.

HEINRICH VOLLMANN.